(12) United States Patent
Jhala et al.

(10) Patent No.: US 8,275,722 B2
(45) Date of Patent: *Sep. 25, 2012

(54) SYSTEM AND METHOD FOR DETERMINING SEMANTICALLY RELATED TERMS USING AN ACTIVE LEARNING FRAMEWORK

(75) Inventors: Pradhuman Jhala, Glendale, CA (US); Xiaofei He, Burbank, CA (US)

(73) Assignee: Yahoo! Inc., Sunnyvale, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/721,358

(22) Filed: Mar. 10, 2010

(65) Prior Publication Data

US 2010/0169249 A1 Jul. 1, 2010

Related U.S. Application Data

(63) Continuation of application No. 11/742,062, filed on Apr. 30, 2007, now Pat. No. 7,707,127.

(51) Int. Cl.
*G06N 5/00* (2006.01)
(52) U.S. Cl. ............................................. 706/12; 706/45
(58) Field of Classification Search .................. 706/12, 706/45; 370/468, 428; 704/10
See application file for complete search history.

(56) References Cited

U.S. PATENT DOCUMENTS

| | | | |
|---|---|---|---|
| 5,920,859 A | 7/1999 | Li | |
| 6,216,123 B1 | 4/2001 | Robertson et al. | |
| 6,347,313 B1 | 2/2002 | Ma et al. | |
| 6,597,703 B1 * | 7/2003 | Li et al. | 370/428 |
| 6,675,159 B1 | 1/2004 | Lin et al. | |
| 6,981,040 B1 | 12/2005 | Konig et al. | |
| 7,080,005 B1 * | 7/2006 | Kao | 704/10 |
| 7,106,756 B1 * | 9/2006 | Donovan et al. | 370/468 |
| 7,707,127 B2 * | 4/2010 | Jhala et al. | 706/16 |
| 2006/0010105 A1 | 1/2006 | Sarukkai et al. | |

OTHER PUBLICATIONS

Hang Cui et al.; "*Probabilistic Query Expansion Using Query Logs*"; WWW 2002, May 7-11, 2002; Honolulu, Hawaii, USA; ACM 1-58113-449-5/02/0005; 9 pages.

Brian D. Davison et al.; "*Finding Relevant Website Queries*"; Department of Computer Sciences & Engineering, Lehigh University; WWW2003, May 20-24, 2003, Budapest, Hungary; 2 pages.

(Continued)

*Primary Examiner* — Wilbert L Starks
(74) *Attorney, Agent, or Firm* — Brinks Hofer Gilson & Lione

(57) ABSTRACT

Systems and methods for determining semantically related terms using an active learning framework such as Transductive Experimental Design are disclosed. Generally, to enhance a keyword suggestion tool, an active learning module trains a model to predict whether a term is relevant to a user. The model is then used to present the user with terms that have been determined to be relevant based on the model so that an online advertisement service provider may more efficiently provide a user with terms that are semantically related to a seed set.

19 Claims, 3 Drawing Sheets

OTHER PUBLICATIONS

Deborah Fallows, PhD; Pew/Internet, Pew Internet & American Life Project; Search Engine Users, *Internet searchers are confident, satisfied and trusting-but they are also unaware and naïve.*; Embargoed for publication until 4pm, Jan. 23, 2005.

Trevor Hastie, et al., "*The Elements of Statistical Learning*", Data Mining, Inference, and Prediction, Springer Series in Statistics. Springer-Verlag, New York, 2001. p. 94-105.

Bartz, K., Murthi, V., and Sebastian, S. "*Logistics Regression and Collaborative Filtering for Sponsored Search Term Recommendation*". ACM Conference on Electronic Commerce (EC'06).

Yu, K., Bi, J., and Tresp, V., "*Active Learning via Transductive Experimental Design*" Proc. of the 23th International Conference on Machine Learning, 2006.

R. Jones, B. Rey, O. Madani, W. Greiner: "Generating Query Substitutions", WWW2006.

U.S. Appl. No. 11/680,495, filed Oct. 7, 2003, Soren Riise.

U.S. Appl. No. 10/713,576, filed Nov. 12, 2003, Shyam Kapur.

U.S. Appl. No. 11/600,603, filed Nov. 15, 2006, Jones.

* cited by examiner

SYSTEM AND METHOD FOR DETERMINING SEMANTICALLY RELATED TERMS USING AN ACTIVE LEARNING FRAMEWORK

RELATED CASES

The present application is a continuation of U.S. patent application Ser. No. 11/742,062 (still pending), filed Apr. 30, 2007, the entirety of which is hereby incorporated by reference.

BACKGROUND

When advertising using an online advertisement service provider such as Yahoo! Search Marketing™, or performing a search using an Internet search engine such as Yahoo!™, users often wish to determine semantically related terms. Two terms, such as words or phrases, are semantically related if the terms are related in meaning in a language or in logic. Obtaining semantically related terms allows advertisers to broaden or focus their online advertisements to relevant potential customers and allows searchers to broaden or focus their Internet searches in order to obtain more relevant search results.

Various systems and methods for determining semantically related terms are disclosed in U.S. Pat. No. 6,269,361; U.S. Pat. Pub No. 2003/0055816 A1, published March 20, 2003; and U.S. patent application Ser. Nos. 11/432,266 and 11/432,585, filed May 11, 2006, each of which are assigned to Yahoo! Inc. For example, in some implementations in accordance with U.S. patent application Ser. Nos. 11/432,266 and 11/432,585, a system determines semantically related terms based on web pages that advertisers have associated with various terms during interaction with an advertisement campaign management system of an online advertisement service provider. In other implementations in accordance with U.S. patent application Ser. Nos. 11/432,266 and 11/432,585, a system determines semantically related terms based on terms received at a search engine and a number of times one or more searchers clicked on particular universal resource locators ("URLs") after searching for the received terms.

When implementing systems and methods such as those described in U.S. patent application Ser. Nos. 11/432,266 and 11/432,585, a user is often presented with an initial set of terms. The user indicates a degree of relevance of one or more terms of the presented set of terms, and the user is then presented with a new set of terms based on the indicated degree of relevance of the terms of the initial set of terms. A user may perform this process multiple times until the user receives a sufficient number of semantically related terms. It would be desirable to develop additional systems and method for determining semantically related terms to reduce the number of times a user repeats the above-described process to receive a sufficient number of semantically related terms.

DETAILED DESCRIPTION OF THE DRAWINGS

The present disclosure is directed to systems and methods for determining semantically related terms using an active learning framework. By using an active learning framework such as Transductive Experimental Design, an online advertisement service provider ("ad provider") may more efficiently present potential semantically related terms to a user so that the user may more quickly determine relevant terms that are semantically related to a seed set.

Figure 1:
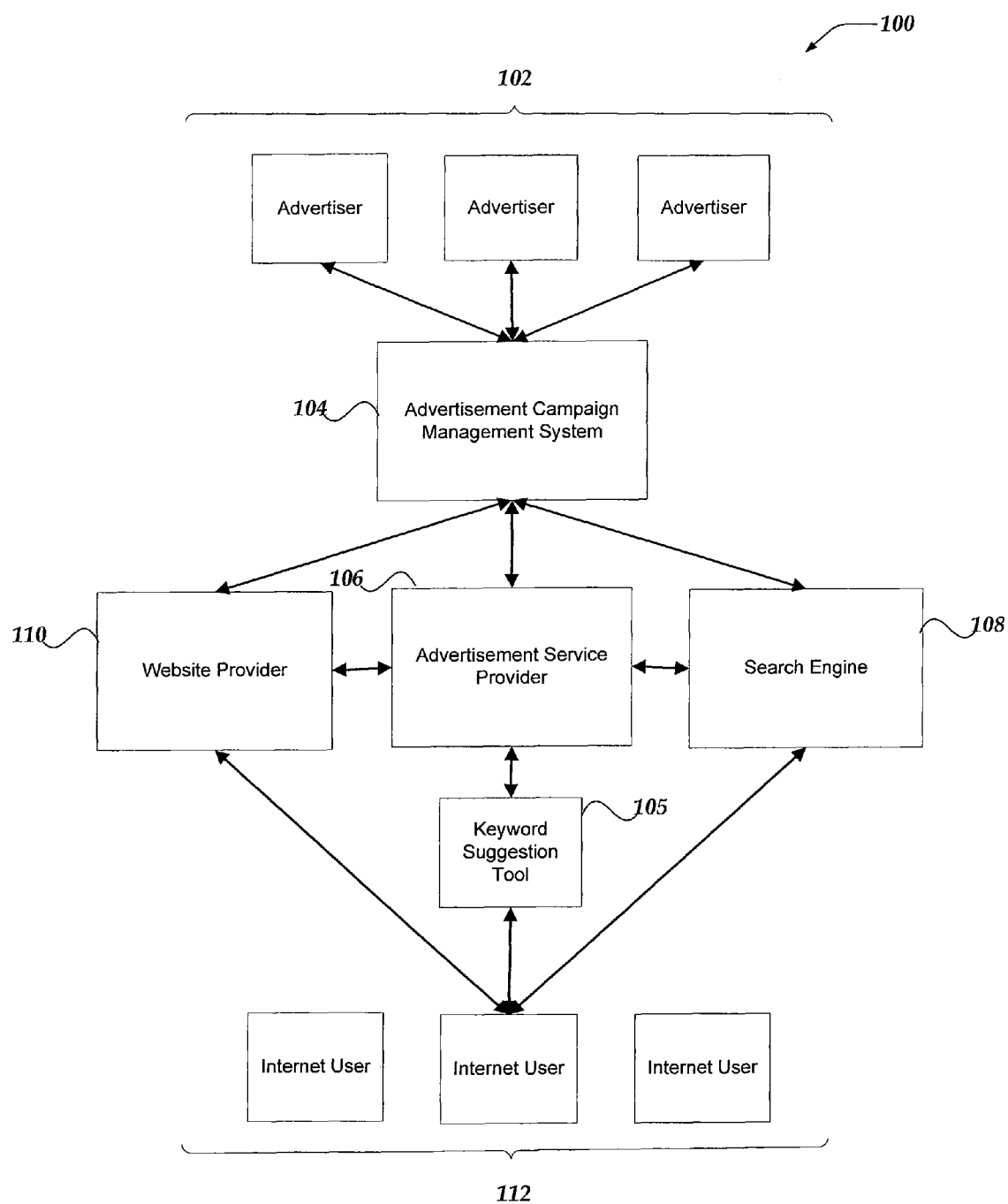
FIG. 1 is a block diagram of one embodiment of an environment in which a system for determining semantically related terms using an active learning framework may operate.

FIG. 1 is a block diagram of one embodiment of an environment in which a system for determining semantically related terms using an active learning framework may operate. However, it should be appreciated that the systems and methods described below are not limited to use with a search engine or pay-for-placement online advertising.

The environment 100 may include a plurality of advertisers 102, an ad campaign management system 104, an ad provider 106, a search engine 108, a website provider 110, and a plurality of Internet users 112. Generally, an advertiser 102 bids on terms and creates one or more digital ads by interacting with the ad campaign management system 104 in communication with the ad provider 106. The advertisers 102 may purchase digital ads based on an auction model of buying ad space or a guaranteed delivery model by which an advertiser pays a minimum cost-per-thousand impressions (i.e., CPM) to display the digital ad. Typically, the advertisers 102 may pay additional premiums for certain targeting options, such as targeting by demographics, geography, or context. The digital ad may be a graphical banner ad that appears on a website viewed by Internet users 112, a sponsored search listing that is served to an Internet user 112 in response to a search performed at a search engine, a video ad, a graphical banner ad based on a sponsored search listing, and/or any other type of online marketing media known in the art.

When an Internet user 112 performs a search at a search engine 108, the ad provider 106 may serve one or more digital ads created using the ad campaign management system 104 to the Internet user 112 based on search terms provided by the Internet user 112. Additionally, when an Internet user 112 views a website served by the website provider 110, the ad provider 106 may serve one or more digital ads to the Internet user 112 based on keywords obtained from a website. When the digital ads are served, the ad campaign management system 104 and the ad provider 106 may record and process information associated with the served digital ads for purposes such as billing, reporting, or ad campaign optimization. For example, the ad campaign management system 104 and ad provider 106 may record the search terms that caused the ad provider 106 to serve the digital ads; whether the Internet user 112 clicked on a URL associated with the served digital ads; what additional digital ads the ad provider 106 served with the digital ad; a rank or position of a digital ad when the Internet user 112 clicked on the digital ad; and/or whether an Internet user 112 clicked on a URL associated with a different digital ad. One example of an ad campaign management system that may perform these types of actions is disclosed in U.S. patent application Ser. No. 11/413,514, filed Apr. 28, 2006, and assigned to Yahoo! Inc.

To assist an advertiser 102 is creating digital ads, the ad campaign management system 104 may utilize a keyword suggestion tool 105 for determining terms that are semantically related to seed terms. Various examples of keyword suggestion tools 105 for determining semantically related terms are disclosed in U.S. Pat. No. 6,269,361, issued July 31, 2006; U.S. Pat. Pub. No. 2003/0055816 A1, published Mar. 20, 2003; U.S. patent application Ser. No. 11/432,266, filed May 11, 2006; U.S. patent application Ser. No. 11/432,585, filed May 11, 2006; U.S. patent application Ser. No. 11/600, 698, filed Nov. 16, 2006; U.S. patent application Ser. No. 11/731,396, filed Mar. 30, 2007; and U.S. patent application Ser. No. 11/731,502, filed Mar. 30, 2007, each of which are assigned to Yahoo! Inc. and the entirety of each of which are hereby incorporated by reference.

In many keyword suggestion tools 105, the keyword suggestion tool 105 receives a seed set including one or more words or phrases. Each seed term may be a positive seed term or a negative seed term. A positive seed term is a term that represents the type of keywords an advertiser 102 would like to bid on to have the ad provider 106 serve a digital ad. A negative seed term is a term that represents the type of keyword an advertiser 102 would not like to bid on to have the ad provider 106 serve a digital ad. In other words, an advertiser 102 uses the keyword suggestion tool 105 to receive more keywords like a positive seed terms, while avoiding keywords like a negative seed term.

The keyword suggestion tool 105 determines a plurality of semantically related terms based on factors such web pages that advertisers 102 have associated with various terms during interaction with the ad campaign management system 104; terms received at the search engine 108 and a number of times one or more internet users 112 clicked on particular universal resource locators ("URLs") after searching for the received terms; sequences of search queries received at the search engine 108 that are related to similar concepts; and/or concept terms within search queries received at the search engine 108.

The determined plurality of semantically related terms are presented to the advertiser 102, and the advertiser 102 may label one or more presented terms as being relevant or not relevant to the advertiser 102. In some implementations, the advertiser 102 may label a term as relevant or not relevant, where in other implementations, the advertiser 102 may indicate a degree of relevance on a scale, such as a scale of zero to ten.

The keyword suggestion tool 105 determines a new plurality of semantically related terms based on the indication of relevance of the previously presented terms, and presents the new plurality of semantically related terms to the advertiser 102. The advertiser 102 then repeats this procedure until the advertiser 102 receives a sufficient number of semantically related terms.

It will be appreciated that the systems and methods for determining semantically related terms using an active learning framework described below may operate in the environment described above with respect to FIG. 1.

Figure 2:
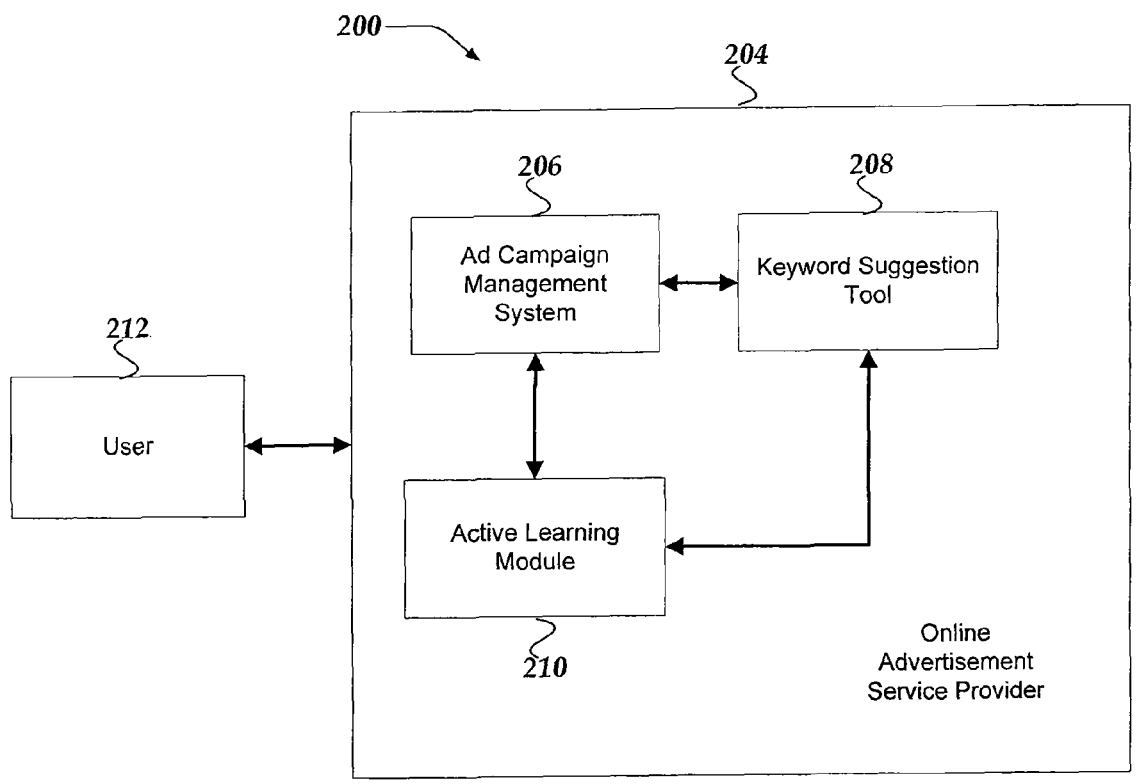
FIG. 2 is a block diagram of one embodiment of a system for determining semantically related terms using an active learning framework.

FIG. 2 is a block diagram of one embodiment of a system for determining semantically related terms using an active learning framework. The system 200 may include an ad provider 204, an ad campaign management system 206, a keyword suggestion tool 208, and an active learning module 210. In some implementations the ad campaign management system 206, keyword suggestion tool 208, and active learning module 210 may be part of the ad provider 204. However, in other implementations, one or more of the ad campaign management system 206, keyword suggestion tool 208, and active learning module 210 may be distinct from the ad provider 204. The ad provider 204, ad campaign management system 206, keyword suggestion tool 208, and active learning module 210 may communicate with each other over one or more external or internal networks. Further, the ad provider 204, ad campaign management system 206, keyword suggestion tool 208, and active learning module 210, may be implemented as software code running in conjunction with a processor such as a single server, a plurality of servers, or any other type of computing device known in the art.

As described in more detail below, a user 212 interacting with the ad campaign management system 206 submits one or more seed terms to receive terms semantically related to the seed terms. The keyword suggestion tool 208 determines an initial plurality of semantically related terms based on the seed terms. The active learning module 210 then determines an initial subset including terms from the initial plurality of semantically related terms. The initial subset includes the terms that will be the most informative in creating a model to predict whether a term is relevant to the user 212. An indication of relevance of one or more terms of the initial subset is received at the ad campaign management system 206, and the active learning module 210 creates a model to predict whether a term is relevant to the user 212 based on the received indication of relevance of one or more terms of the initial subset. The keyword suggestion tool 208 determines a second plurality of semantically related terms based on the received indication of relevance of one or more terms of the initial subset, and the active learning module 210 determines a second subset including terms from the second plurality of semantically related terms based on the created model and one or more properties of each term of the second plurality of semantically related terms. An indication of relevance of one or more terms of the second subset is received and the active learning module 210 updates the model to more accurately predict whether a term is relevant to the user 212 for use with the next plurality of semantically related terms determined by the keyword suggestion tool 208. This process is repeated until the user obtains a sufficient number of semantically related terms.

As summarized above, the user 212 submits one or more seed terms to systems of the ad provider 204 such as the ad campaign management system 206. The ad campaign management system 206 communicates the seed terms to the keyword suggestion tool 208 and the keyword suggestion tool 208 determines an initial plurality of semantically related terms based on the received seed terms. Various examples of keyword suggestion tools 208 that may determine a plurality of semantically related terms based on seed terms are disclosed in U.S. patent application Ser. No. 11/432,266, filed May 11, 2006; U.S. patent application Ser. No. 11/432,585, filed May 11, 2006; U.S. patent application Ser. No. 11/600, 698, filed Nov. 16, 2006; U.S. patent application Ser. No. 11/731,396, filed Mar. 30, 2007; and U.S. patent application Ser. No. 11/731,502, filed Mar. 30, 2007, each of which are assigned to Yahoo! Inc.

The initial plurality of semantically related terms are communicated to the active learning module 210 and the active learning module 210 examines the initial plurality of semantically related terms to determine an initial subset of terms that are the most informative in creating a model to predict whether a term is relevant to the user 212. In one implementation, the active learning module 210 determines the initial subset of terms based on a predicative error of a term. The predictive error of a term measures a likelihood of a term to cause a true error in a model. For example, as described below, the active learning module 210 creates a model for predicting whether a term is relevant to a user. A term causes a true error in the model if the term is relevant to a user and a model predicts the term is not relevant to the user, or when the term is not relevant to a user and the model predicts the term is relevant to the seed user. Thus, the predictive error of the term is a value that represents the likelihood that the term will cause a model to result in either of the above-described conditions.

In one implementation, a predictive error of a term is calculated using the equation:

$$err(x) = x^T(XX^T)^{-1}x$$

where x is a term vector that the active learning module 210 is calculating the predictive error of, X is a matrix including each term vector, and T stands for transpose. A term vector is a vector including a set of values for properties, also known as features, which represent a term such as an edit distance between a term and a seed term; a word distance between a term and a seed term; a prefix overlap between a term and a seed term; a suffix overlap between a term and a seed term; or any other features of a term that may be useful in predicting whether a term is relevant to the user 212.

Generally, edit distance, also known as Levenshtein distance, is the smallest number of inserts, deletions, and substitutions of characters needed to change a first term into a second term and word edit distance is the smallest number of insertions, deletions, and substitutions of words needed to change a first term into a second term. Prefix overlap occurs between two terms when one or more words occur at the beginning of both terms. For example, the terms "Chicago Bears" and "Chicago Cubs" have a prefix overlap due to the fact the word "Chicago" occurs at the beginning of both terms. Similarly, suffix overlap occurs between two terms when one or more words occur at the end of both terms. For example, the terms "San Francisco Giants" and "New York Giants" have a suffix overlap due to the fact the word "Giants" occurs at the end of the both terms.

The active learning module 210 communicates the initial subset of the terms to systems such as the ad campaign management system 206, which presents at least a portion of the terms of the initial subset to the user 212. The user 212 labels one or more of the presented terms of the initial subset as being relevant or not relevant. In some implementations, the user 212 indicates a term is relevant or not relevant, where in other implementations, the user 212 may indicate a degree of relevance on a scale, such as zero to ten.

The ad campaign management system 206 receives the relevance labels regarding the initial subset from the user 212 and communicates the relevance labels regarding the initial subset to the active learning module 210. Based on the relevance labels regarding the initial subset, the active learning module 210 creates a model to predict whether the user 212 will find a term relevant. Generally, the model is a function which predicts whether a term is relevant to the user 212 based on properties of a term, also known as features of a term.

In one implementation, the active learning module 210 trains a model to predict whether the user 212 will find a term relevant based on the equations:

$$\min_w \sum_{i=1}^n (w^T x_i - y_i)^2$$

and $$\overline{w} = (XX^T)^{-1} = Xy$$

where x is a term vector of the initial subset, y is the relevance label associated with the term by the user 212, w is a weight vector, X is a matrix containing a term vector for each term of the initial subset, and T stands for transpose. The weight vector w is the value for which the above equations are solved to create a linear model for predicting whether a term is relevant to the user 212 using the equation:

$$f(x) = w^T x$$

where w is the weight vector, x is a given term vector, and T stands for transpose. Once w is obtained, the function f(x) may be used to predict the relevance of a term x. In some implementations, as explained in more detail below, when a plurality of semantically related terms is received from the keyword suggestion tool 208, the terms are ranked based on their resulting value of the function f(x), and one or more of the top terms are presented to the user 212.

Before, after, or at the same time as the active learning module 210 trains a model to predict whether the user 212 will find a term relevant, the keyword suggestion tool 208 determines a second plurality of semantically related terms based on the received relevance labels regarding the initial subset. The active learning module 210 examines the terms of the second plurality of semantically related terms and may rank at least a portion of the terms of the second plurality of semantically related terms based on the created model and one or more properties of each term. In some implementations, properties of the term such as edit distance, word edit distance, prefix overlap, and suffix overlap are extracted from the term and inserted into the created model, resulting in a numerical value representing the likelihood that the user 212 will find the term relevant. The active learning module 210 may rank at least a portion of the terms of the second plurality of semantically related terms based on the resulting numerical value. Additionally, the active learning module 210 may compare the resulting numerical value to a threshold to determine whether the term is likely relevant, or not relevant to the user 212. The threshold may be any value set by the active learning module 210 that is indicative of terms that are relevant, or not relevant, to the user 212.

Based on the ranking of terms of the second plurality of semantically related terms, the active learning module 212 determines a second subset including terms from the second plurality of semantically related terms. In one implementation, the subset may include the top ten terms having the highest likelihood of being relevant to the user 212 based on the model and one or more properties of the terms. However, the subset may include any number of terms. The active learning module 212 communicates the second subset to the ad campaign management system 206, which presents at least a portion of the terms of the second subset to the user 212.

As described above, the user 212 labels one or more terms of the presented terms of the second subset. The ad campaign management system 206 communicates the received relevance labels regarding the second subset to the active learning module 212, which adjusts the model to more accurately predict the relevance of a term to the user 212 based on the received relevance labels regarding the second subset. For example, the active learning module 212 may adjust weights associated with properties of a term such as edit distance, word edit distance, prefix overlap, or suffix overlap in the model to more accurately reflect properties which reliably indicate that a term is relevant, or not relevant to the user 212. It will be appreciated that the above-described procedure may then be repeated multiple times until the user 212 receives a sufficient number of semantically related terms.

Figure 3:
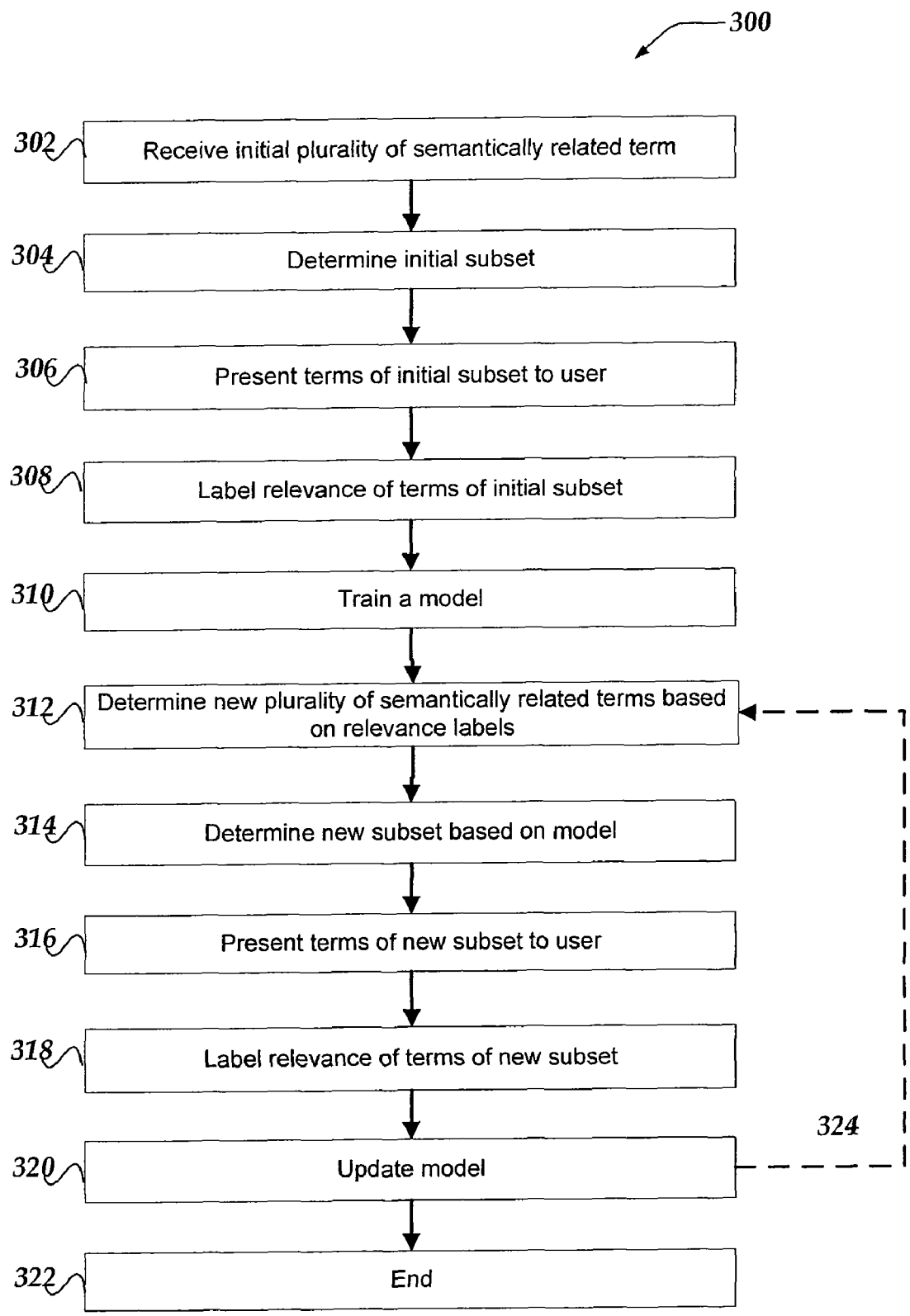
FIG. 3 is a flow chart of one embodiment of a method for determining semantically related terms using an active learning framework.

FIG. 3 is a flow chart of one embodiment of a method for determining semantically related terms using an active learning framework. The method 300 begins with an active learning module receiving an initial plurality of semantically related terms from a keyword suggestion tool at step 302. As discussed above, the keyword suggestion tool determines the initial plurality of semantically related terms based on one or more seed terms.

The active learning module determines an initial subset including terms from the initial plurality of semantically related terms at step 304. The initial subset includes terms that will be the most informative in training a model to predict whether a user will label a term as relevant. In one implementation, the active learning module determines whether a term will be informative in training a model based on a predictive error of a term that measures a likelihood of a term to cause a model to result in a true error.

Systems such as an ad campaign management system present one or more terms of the initial subset to a user at step 306. The user labels the relevance of one or more of the presented terms of the initial subset at step 308. In one implementation the user labels the term as being relevant, or not relevant, where in other implementations the user labels the relevance of a term on a scale, such as zero to ten.

Based on the received relevance labels regarding the initial subset, the active learning module trains a model to predict whether a user will find a term relevant at step 310. Before, after, or at the same time as the active learning module trains the model at step 310, the keyword suggestion tool determines a second plurality of semantically related terms at step 312 based on the received relevance labels regarding the initial subset. The active learning module examines the second plurality of semantically related terms and determines a second subset including terms from the second plurality of semantically related terms at step 314 based on the model created at step 310 and one or more properties of each term of the second plurality of semantically related terms. In one implementation, the active learning module ranks the terms of the second plurality of semantically related terms based on a likelihood of terms being relevant to the user according to the model and selects a predetermined top number of terms as the second subset including terms from the second plurality of semantically related terms.

Systems such as the ad campaign management system present one or more terms of the second subset to the user at step 316. The user labels the relevance of one or more of the presented terms at step 318. Based on the relevance labels regarding the second subset, the active learning module updates the model at step 320 to more accurately predict whether the user will find a term relevant.

If the user does not desire additional semantically related terms, the method ends at step 322. However, if the user desires more semantically related terms, the method loops 324 to step 312 and steps 312 through 320 are repeated until the user does not desire additional semantically related terms and the method ends at step 322.

It should be appreciated that by creating a model to predict whether a term is relevant to a user and presenting the user with terms that have been determined to be relevant based on the model, an ad provider may more efficiently provide a user with potential semantically related terms by enhancing the performance of a keyword suggestion tool such as those described in U.S. patent application Ser. No. 11/432,266, filed May 11, 2006; U.S. patent application Ser. No. 11/432,585, filed May 11, 2006; U.S. patent application Ser. No. 11/600,698, filed Nov. 16, 2006; U.S. patent application Ser. No. 11/731,396, filed Mar. 30, 2007; and U.S. patent application Ser. No. 11/731,502, filed Mar. 30, 2007, each of which are assigned to Yahoo! Inc.

FIGS. 1-3 disclose systems and methods for determining terms semantically related to a seed set using an active learning framework such as Transductive Experimental Design. As described above, these systems and methods may be implemented to enhance keyword suggestion tools for uses such as discovering semantically related words for purposes of bidding on online advertisements or to assist a searcher performing research at an Internet search engine.

With respect to assisting a searcher performing research at an Internet search engine, a searcher may send one or more terms, or one or more sequences of terms, to a search engine. The search engine may use the received terms as seed terms and suggest semantically related words related to the terms either with the search results generated in response to the received terms, or independent of any search results. Providing the searcher with semantically related terms allows the searcher to broaden or focus any further searches so that the search engine provides more relevant search results to the searcher.

With respect to online advertisements, in addition to providing terms to an advertiser in a keyword suggestion tool, an online advertisement service provider may use the disclosed systems and methods in a campaign optimizer component to determine semantically related terms to match advertisements to terms received from a search engine or terms extracted from the content of a webpage or news articles, also known as content match. Using semantically related terms allows an online advertisement service provider to serve an advertisement if the term that an advertiser bids on is semantically related to a term sent to a search engine rather than only serving an advertisement when a term sent to a search engine exactly matches a term that an advertiser has bid on. Providing the ability to serve an advertisement based on semantically related terms when authorized by an advertiser provides increased relevance and efficiency to an advertiser so that an advertiser does not need to determine every possible word combination for which the advertiser's advertisement is served to a potential customer.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for determining semantically related terms, the method comprising:
presenting, with a processor, one or more terms of a first plurality of semantically related terms to a user based on a predictive error of each term of the first plurality of semantically related terms;
receiving, with a processor, an indication of relevance of at least one of the terms of the first plurality of semantically related terms presented to the user;
training a model, with a processor, to predict an indication of relevance of a term by the user based on the received indication of relevance of at least one of the terms of the first plurality of semantically related terms presented to the user;
receiving a second plurality of semantically related terms from a keyword suggestion tool; and
presenting, with a processor, one or more terms of the second plurality of semantically related terms to the user based on the model and one or more properties of each term of the second plurality of semantically related terms.

2. The computer-implemented method of claim 1, wherein presenting one or more terms of the first plurality of semantically related terms to a user based on a predictive error of each term of the first plurality of semantically related terms comprises:
determining a subset of terms of the first plurality of semantically related terms based on a predictive error of each term; and
presenting the subset of terms to the user.

3. The computer-implemented method of claim 1, where a predictive error of a term is calculated using the equation:

$$err(x)=x^T(XX^T)^{-1}x$$

where x is a term vector associated with a term of the first plurality of semantically related terms and X is a matrix including a term vector for each term of the first plurality of semantically related terms.

4. The computer-implemented method of claim 1, wherein the one or more properties of each term of the second plurality of semantically related terms includes at least one of edit distance or word distance.

5. The computer-implemented method of claim 1, wherein presenting one or more terms of the second plurality of semantically related terms to the user based on the model and one or more properties of each term of the second plurality of semantically related terms comprises:
   extracting one or more properties of a term of the second plurality of semantically related terms;
   determining a predicted indication of the relevance of the term based on the extracted properties and the model; and
   comparing the predicted indication of relevance of the term to a threshold.

6. The computer-implemented method of claim 1, further comprising:
   receiving an indication of relevance of at least one of the one or more terms presented to the user from the second plurality of semantically related terms; and
   adjusting the model based on the received indication of relevance of at least one term presented to the user from the second plurality of semantically related terms.

7. The computer-implemented method of claim 6, further comprising:
   receiving a third plurality of semantically related terms form the keyword suggestion tool; and
   presenting one or more terms of the third plurality of semantically related terms to the user based on the adjusted model and one or more properties of each term of the third plurality of semantically related terms.

8. A computer-readable storage medium comprising a set of instructions for determining semantically related terms, the set of instructions to direct a processor to perform acts of:
   presenting one or more terms of a first plurality of semantically related terms to a user based on a predictive error of each term of the first plurality of semantically related terms;
   receiving an indication of relevance of at least one of the one or more terms presented to the user from the first plurality of semantically related terms;
   training a model to predict an indication of relevance of a term by the user based on the received indication of relevance of at least one of the one or more terms presented to the user from the first plurality of semantically related terms;
   receiving a second plurality of semantically related terms from a keyword suggestion tool; and
   presenting one or more terms of the second plurality of semantically related terms to the user based on the model and one or more properties of each term of the second plurality of semantically related terms.

9. The computer-readable storage medium of claim 8, wherein presenting one or more terms of the first plurality of semantically related terms to a user based on a predictive error of each term of the first plurality of semantically related terms comprises:
   determining a subset of terms of the first plurality of semantically related terms based on a predictive error of each term; and
   presenting the subset of terms to the user.

10. The computer-readable storage medium of claim 8, where a predictive error of a term is calculated using the equation:

$$err(x)=x^T(XX^T)^{-1}x$$

where x is a term vector associated with a term of the first plurality of semantically related terms and X is a matrix including a term vector for each term of the first plurality of semantically related terms.

11. The computer-readable storage medium of claim 8, wherein the one or more properties of each term of the second plurality of semantically related terms includes at least one of edit distance or word distance.

12. The computer-readable storage medium of claim 8, wherein presenting one or more terms of the second plurality of semantically related terms to the user based on the model and one or more properties of each term of the second plurality of semantically related terms comprises:
   extracting one or more properties of a term of the second plurality of semantically related terms;
   determining a predicted indication of the relevance of the term based on the extracted properties and the model; and
   comparing the predicted indication of relevance of the term to a threshold.

13. The computer-readable storage medium of claim 8, further comprising a set of instructions to direct a processor to perform acts of:
   receiving an indication of relevance of at least one of the one or more terms presented to the user from the second plurality of semantically related terms; and
   adjusting the model based on the received indication of relevance of at least one term presented to the user from the second plurality of semantically related terms.

14. The computer-readable storage medium of claim 13, further comprising a set of instructions to direct a processor to perform acts of:
   receiving a third plurality of semantically related terms form the keyword suggestion tool; and
   presenting one or more terms of the third plurality of semantically related terms to the user based on the adjusted model and one or more properties of each term of the third plurality of semantically related terms.

15. A system for determining a semantically related term comprising:
   a keyword suggestion tool comprising a processor and a storage medium, the keyword suggestion tool configured to determine a plurality of semantically related terms based on a seed set;
   an active learning module comprising a processor and a storage medium that is in communication with the keyword suggestion tool, the active learning module configured to:
      receive a first plurality of semantically related terms from the keyword suggestion tool;
      select a first subset comprising at least one term of the first plurality of semantically related terms based on a predictive error of each term of the semantically related terms;

receive an indication of relevance from a user of at least one term of the first subset;

train a model to predict an indication of relevance of a term by the user based on the received indication of relevance of the at least one term of the first subset;

receive a second plurality of semantically related terms from the keyword suggestion tool; and select a second subset comprising at least one term of the second plurality of semantically related terms based on the model and one or more properties of each term of the second plurality of semantically related terms.

16. The system of claim 15, where to select a second subset comprising at least one term of the second plurality of semantically related terms based on the model and one or more properties of each term of the second plurality of semantically related terms, the active learning module is further configured to:

extract one or more properties of a term of the second plurality of semantically related terms;

determine a predicted indication of relevance of the term based on the extracted properties and the model; and compare the predicted indication of relevance of the term to a threshold.

17. The system of claim 15, wherein the one or more properties of each term of the second plurality of semantically related terms includes at least one of edit distance or word distance.

18. The system of claim 15, wherein the active learning module is further configured to:

receive an indication of relevance from the user of at least one term of the second subset; and adjust the model based on the received indication of relevance of at least one term of the second subset.

19. The system of claim 18, wherein the active learning module is further operative to:

receive a third plurality of semantically related terms from the keyword suggestion tool; and select a third subset comprising at least one term of the third plurality of semantically related terms based on the adjusted model and one or more properties of the third plurality of semantically related terms.

* * * * *